United States Patent
Sasabe et al.

(10) Patent No.: US 12,517,144 B2
(45) Date of Patent: Jan. 6, 2026

(54) SCREENING METHOD FOR BLOOD IgA PRODUCTION INHIBITOR OR FOR PROPHYLACTIC OR THERAPEUTIC AGENT AGAINST DISEASES CAUSED BY EXCESSIVE IgA IN BLOOD

(71) Applicants: Jumpei Sasabe, Tokyo (JP); Masataka Suzuki, Tokyo (JP); Sadakazu Aiso, Tokyo (JP)

(72) Inventors: Jumpei Sasabe, Tokyo (JP); Masataka Suzuki, Tokyo (JP); Sadakazu Aiso, Tokyo (JP)

(*) Notice: Subject to any disclaimer, the term of this patent is extended or adjusted under 35 U.S.C. 154(b) by 935 days.

(21) Appl. No.: 16/340,786

(22) PCT Filed: Oct. 13, 2017

(86) PCT No.: PCT/JP2017/037194
§ 371 (c)(1),
(2) Date: Nov. 4, 2019

(87) PCT Pub. No.: WO2018/070524
PCT Pub. Date: Apr. 19, 2018

(65) Prior Publication Data
US 2020/0386776 A1    Dec. 10, 2020

(30) Foreign Application Priority Data
Oct. 14, 2016 (JP) .................... 2016-202769

(51) Int. Cl.
*G01N 33/94* (2006.01)
*C12Q 1/06* (2006.01)

(52) U.S. Cl.
CPC ........ *G01N 33/9493* (2013.01); *C12Q 1/06* (2013.01); *G01N 2333/335* (2013.01); *G01N 2800/347* (2013.01); *G01N 2800/50* (2013.01)

(58) Field of Classification Search
CPC .......... G01N 33/9493; G01N 33/9446; G01N 2333/335; G01N 2800/347; G01N 2800/50; C12Q 1/06
See application file for complete search history.

(56) References Cited

U.S. PATENT DOCUMENTS

| | | | | |
|---|---|---|---|---|
| 6,294,581 | B1 * | 9/2001 | Takesako | A61P 37/06 514/616 |
| 6,316,502 | B1 * | 11/2001 | Lai | A61P 25/16 514/599 |
| 2004/0028689 | A1 * | 2/2004 | Borody | A61K 36/062 424/184.1 |
| 2005/0025709 | A1 * | 2/2005 | McBride | A61P 31/10 424/9.34 |
| 2013/0230560 | A1 | 9/2013 | Tachibe et al. | |
| 2014/0199281 | A1 * | 7/2014 | Henn | A61K 38/13 424/93.46 |

FOREIGN PATENT DOCUMENTS

| | | |
|---|---|---|
| CA | 2316671 A1 * | 6/2001 |
| JP | 2013-181003 | 9/2013 |
| JP | 2014-1170 | 1/2014 |
| WO | 99/59567 | 11/1999 |

OTHER PUBLICATIONS

Angelis et al. 2014 (Microbiota and Metabolome Associated with Immunoglobulin A Nephropathy (IgAN; PLOS One 9(6): 1-15). (Year: 2014).*
Dunn et al. 1998 (Effect of Oral Administration of Freeze-Dried Lactobacillus acidophilus on Small Bowel Bacterial Overgrowth in Patients with End Stage Kidney Disease: Reducing Uremic Toxins and Improving Nutrition; Int. Dairy Journal 8:545-553). (Year: 1998).*
International Search Report (ISR) issued Jan. 9, 2018 in International (PCT) Application No. PCT/JP2017/037194.
Jumpei Sasabe et al., "Interplay between microbial D-amino acids and host D-amino acid oxidase modifies murine mucosal defense and gut microbiota", Nature Microbiology, doi: 10.1038/nmicrobiol.2016.125., p. 1-5, Fig.4, Jul. 25, 2016, cited in CA.
J. Floege et al., "The mucosa-kidney axis in IgA nephropathy", Nature Reviews Nephrology, vol. 12, pp. 147-156, Mar. 2016.
Yurika Miyoshi et al., "Alteration of D-amino acid levels in the animals lacking enzymes relating D-amino acids, Vitamin", vol. 88, No. 10, Shigeoka, Shigeru, pp. 515-523, 2014, with abstract & cited in CA.
Lam H., et al., "D-Amino Acids Govern Stationary Phase Cell Wall Remodeling in Bacteria," Science; 325:1552-1555, 2009, pp. 1-5.

* cited by examiner

*Primary Examiner* — Oluwatosin A Ogunbiyi
(74) *Attorney, Agent, or Firm* — Wenderoth, Lind & Ponack, L.L.P.

(57) ABSTRACT

Provided are: a screening method suited for screening for a blood IgA production inhibitor, a blood IgA production promoting agent, or a prophylactic or therapeutic agent against diseases caused by excessive IgA in the blood; an inhibitor of blood IgA production; and a promoting agent of blood IgA production. Also, provided are: a method suited for controlling the amount of IgA in the blood; a method for assessing the risk, severity, or state of diseases caused by excessive IgA in the blood; and a method for presenting, at least one selected from enteric bacteria to be removed and enteric bacteria to be administered, in order to prevent or treat diseases caused by excessive IgA in the blood.

2 Claims, 4 Drawing Sheets

Specification includes a Sequence Listing.

FIG. 1

PLASMA IgA LEVELS IN WILD-TYPE MICE AND DAO ACTIVITY-DEFICIENT MICE WITH AND WITHOUT ADMINISTRATION OF ANTIBIOTICS.

FIG. 2

PLASMA IgA LEVELS OVER TIME IN WILD-TYPE MICE AND DAO ACTIVITY-DEFICIENT MICE AFTER TRANSPLANTATION OF HIGHLY SENSITIZING GUT MICROBIOTA

FIG. 3

DIFFERENCE IN DAO-DEPENDENT PLASMA IgA INDUCING ABILITIES DUE TO DIFFERENCE IN THE COMPOSITIONS OF GUT MICROBIOTAS

FIG. 4

ACTION ON BLOOD CELL DAO AND IgA PRODUCTION BY BONE MARROW TRANSPLANTATION

FIG. 5

DAO ACTIVITY IN IgA NEPHROPATHY MODEL MICE

FIG. 6

SCREENING METHOD FOR BLOOD IgA PRODUCTION INHIBITOR OR FOR PROPHYLACTIC OR THERAPEUTIC AGENT AGAINST DISEASES CAUSED BY EXCESSIVE IgA IN BLOOD

TECHNICAL FIELD

The present invention relates to a method of screening for an inhibitor of production of immunoglobulin A (IgA) in the blood or a prophylactic or therapeutic agent against diseases caused by excessive IgA in the blood; a production inhibitor of IgA in the blood or a prophylactic or therapeutic agent against diseases caused by excessive IgA in the blood; a method of inhibiting the production of IgA in the blood of an individual; a method of screening for a promoting agent of IgA production in the blood; a method of promoting IgA production in the blood of an individual; a method of assessing risk, severity or state of a disease caused by excessive IgA in the blood; and a method of presenting at least one species selected from the group consisting of enteric bacteria to be removed and enteric bacteria to be administered to prevent or treat diseases caused by excessive IgA in blood.

BACKGROUND ART

Mucosae of intestinal epithelium are constantly exposed to microorganisms, and a mucosal immune defense system that protects mucosal surfaces is known to exist. The mucosal immune defense system includes an "innate immune system" which is an initial defense against an organism and an "acquired immune system" for eliminating a specific antigen. D-amino acid oxidase expressed in the small intestine (D-amino acid oxidase; hereafter simply referred to as "DAO") functions as a part of the innate immune system by degrading bacteria-derived D-amino acids in the intestine to generate hydrogen peroxide and eliminate pathogens (Non-Patent Document 1). Here, D-amino acids are optical isomers of L-amino acids. L-amino acids are ubiquitously used by life for ribosome-mediated protein synthesis, whereas D-amino acids have different physiological functions from those of L-amino acids. In mammals, two D-amino acids (D-serine and D-aspartic acid) are mainly distributed in the brain and are considered to be associated with neurotransmission and neuroendocrine. In addition, bacterial synthesis of more than 13 D-amino acids, which are different from mammalian D-amino acids, has been reported and the 13 D-amino acids are used for construction and reconstruction of bacterial cell walls. Gut microbiota is known to synthesize, in particular, D-alanine, D-proline, D-glutamic acid and D-aspartic acid.

On the other hand, although the acquired immune system having a central role in the mucosal immune defense system is IgA, the full view of control mechanism has not been clarified yet (Non-Patent Document 2). Here, IgA is a sort of an antibody that controls acquired immunities. IgA is mainly secreted by plasma cells present in the mucosal epithelium and is responsible for maintaining homeostasis in intestinal tracts, respiratory tracts and nasal cavities. It is also known that colostrum is rich in IgA and protects an intestinal tract of a newborn, which is not able to produce many antibodies on its own, from bacteria and viruses.

Non-Patent Document 1: Sasabe et al., Nature Microbiology, 1:16125(2016)
Non-Patent Document 2: Nature Reviews Nephrology 12,147-156(2016)

DISCLOSURE OF THE INVENTION

Problems to be Solved by the Invention

In view of the above prior art, an object of the present invention is to provide a method of screening suitable for screening for an inhibitor of IgA production in the blood, a blood IgA production promoting agent, or a prophylactic or therapeutic agent against diseases caused by excessive IgA in the blood; and a blood IgA production inhibitor or a prophylactic or therapeutic agent for diseases caused by excessive IgA in the blood; to provide a method suitable for controlling an amount of IgA in the blood; and to provide a method of assessing risk, severity or state of diseases caused by excessive IgA in the blood, and a method of presenting at least one species selected from the group consisting of enteric bacteria to be removed and enteric bacteria to be administered to prevent or treat a disease caused by excessive IgA in the blood.

Means for Solving the Problems

The present inventors have found that the DAO, a part of the innate immune system in the mucosa, can control the production of IgA belonging to the acquired immune system, and based on the above finding, the present inventors have completed the present invention. That is, the present invention is as follows.

A first embodiment of the present invention is a method of screening for an inhibitor of IgA production in the blood or a prophylactic or therapeutic agent against diseases caused by excessive IgA in the blood, wherein the method includes an induction of gene expression of an antibacterial protein in the intestinal innate immune system, an enhancement of expression or activity of the antibacterial protein, an increase of reaction efficiency of the antibacterial protein or a decrease in the number of at least one species of bacteria selected from a group of sensitizing bacteria or an increase in the number of bacteria of genus *Lactobacillus*, as an index.

A second embodiment of the present invention is an inhibitor of blood IgA production or a prophylactic or therapeutic agent against diseases caused by excessive IgA in the blood, wherein the blood IgA production inhibitor or the prophylactic or therapeutic agent against diseases caused by excessive IgA in the blood comprises a reaction substrate for an antibacterial protein of the intestinal innate immune system, bacteria of genus *Lactobacillus* or an antibiotic.

A third embodiment of the invention is a method of inhibiting production of IgA in the blood of an individual (except for a human), wherein the method comprises inducing gene expression of an antibacterial protein in the intestinal innate immune system, enhancing expression or activity of the antibacterial protein, or administering a reaction substrate for the antibacterial protein, bacteria of genus *Lactobacillus* or an antibiotic.

A fourth embodiment of the present invention is a method of screening for a promoting agent of IgA production in the blood, wherein the method uses inhibition of gene expression of an antibacterial protein in the intestinal innate immune system, inhibition of expression or activity of the antibacterial protein, or an increase in the number of at least one species of bacteria belonging to a group of the sensitizing bacteria or a decrease in the number of bacteria of genus *Lactobacillus*, as an index.

A fifth embodiment of the present invention is a method of promoting IgA production in the blood of an individual (except for a human), wherein the method comprises inhibiting gene expression of an antibacterial protein in the intestinal innate immune system, inhibiting expression or activity of the antibacterial protein, or administering at least one species of bacteria belonging to a group of the sensitizing bacteria.

A sixth embodiment of the present invention is a method of assessing risk, severity or state of diseases caused by excessive IgA in the blood, wherein the method is based on frequency of presence of enteric bacteria that produce a reaction substrate for an antibacterial protein in a gut microbiota of an individual with lowered gene expression of an antibacterial protein of the intestinal innate immune system or an individual with lowered expression or activity of the antibacterial protein.

A seventh aspect of the present invention is a method of presenting at least one species selected from the group consisting of enteric bacteria to be removed and enteric bacteria to be administered to prevent or treat diseases caused by excessive IgA in the blood, wherein the method is based on frequency of presence of enteric bacteria that produce a reaction substrate for an antibacterial protein in a gut microbiota of an individual with lowered gene expression of the antibacterial protein in the intestinal innate immune system or an individual with lowered expression or activity of the antibacterial protein.

Effects of the Invention

According to the present invention, it is possible to suitably screen for a blood IgA production inhibitor, a blood IgA production promoting agent, or a prophylactic or therapeutic agent against a disease caused by excessive IgA in the blood (e.g., glomerulotubular nephritis caused by excessive IgA in the blood). Also, according to the present invention, it is possible to provide a production inhibitor of IgA in the blood or a preventive or therapeutic agent of a disease caused by excessive IgA in the blood. According to the present invention, the amount of IgA in the blood can be appropriately controlled. Further, according to the present invention, it is possible to provide a method of assessing risk, severity or state of a disease caused by excessive IgA in the blood; and a method of presenting at least one species selected from the group consisting of enteric bacteria to be removed and enteric bacteria to be administered to prevent or treat a disease caused by excessive IgA in the blood.

BRIEF DESCRIPTION OF THE DRAWINGS

FIG. 1A is a drawing showing plasma IgA levels in wild-type mice and DAO activity-deficient mice under conditions with and without administration of antibiotics;

FIG. 1B is a drawing showing changes in the relative amounts of enteric bacteria caused by administration of antibiotics;

PREFERRED MODE FOR CARRYING OUT THE INVENTION

Although embodiments of the present invention are described in detail below, the present invention is not limited to the following embodiments, and may be implemented with appropriate modifications within the scope of the object of the present invention. In the present specification and the claims, the "group of sensitizing bacteria" means a group of bacteria that may contribute to an increase in IgA in the blood and is not particularly restricted as long as the group of sensitizing bacteria can contribute to an increase in IgA in the blood. A group of bacteria belonging to genus *Allobaculum*, genus *Turicibacter*, family S24-7 of order Bacteroidales, genus *Desulfovibrio*, order Clostridiales, genus *Streptococcus*, family Halomonadaceae, order Streptophyta, and family Coriobacteriaceae can be included.

<Method of Screening for Inhibitor of IgA Production in the Blood or Prophylactic or Therapeutic Agent for Diseases Caused by Excessive Blood IgA>

The screening method according to the first embodiment can screen for an inhibitor of IgA production in the blood or a prophylactic or therapeutic agent against diseases caused by excessive IgA in the blood, by using an induction of gene expression of an antibacterial protein of the intestinal innate immune system, enhancement of expression or activity of the antibacterial protein, an increase of reaction efficiency of the antibacterial protein, or a decrease in the number of at least one species of bacteria belonging to the group of sensitizing bacteria or an increase in the number of bacteria of genus *Lactobacillus*. In the first embodiment, screening refers to at least narrowing population of test substances by administering a test substance to an organism (e.g., animals) or small intestinal epithelial cells and using an induction of gene expression an antibacterial protein of the intestinal innate immune system, an enhancement of expression or activity of the antibacterial protein, or an increase of reaction efficiency of the antibacterial protein as an index. It is preferred to select candidates for the inhibitor of IgA production in the blood or candidates for the prophylactic or therapeutic agent for a disease caused by excessive IgA in the blood. The screening method according to the first embodiment preferably comprises evaluating a promoting effect of the expression of the antibacterial protein, a promoting effect of activity of the antibacterial protein, or an increasing effect of reaction efficiency of the antibacterial protein by the test substances administered, or evaluating a decrease in the number of at least one species of bacteria belonging to the group of sensitizing bacteria or an increase in the number of bacteria of genus *Lactobacillus*, and selecting candidates for the inhibitor of IgA production in the blood, or candidates for the prophylactic or therapeutic agent against diseases caused by excessive IgA in the blood.

The screening method can be any screenings, such as in vivo screening, in vitro screening, or in silico screening, as long as the above is used as an index. Preferred examples of screening methods according to the first embodiment include the following:

(1) a method of screening, comprising: administering (e.g., orally, intravenously, etc.) a test substance to an organism (e.g., an animal); comparing a result of the administration of the test substance with a result of non-administration of the test substance or a result of a negative control (control in which a substance which does not affect the expression or activity of the antibacterial protein is administered), by using, as an index, expressional induction of an antibacterial protein (e.g., DAO) in the intestinal innate immune system or the antibacterial protein, enhancement of the activity of the antibacterial protein, an increase of reaction efficiency of the antibacterial protein, or a decrease in the number of at least one species of bacteria belonging to the group of sensitizing bacteria or an increase in the number of bacteria of genus *Lactobacillus*; evaluating a promoting effect of the expression of the antibacterial protein, a promoting effect of the activity of the antibacterial protein, or an increasing effect of reaction efficiency of the antibacterial protein by the test substance; or evaluating a decrease in the number of at least one species of bacteria belonging to the group of sensitizing bacteria or an increase in the number of bacteria of genus *Lactobacillus*; and selecting candidates for the inhibitor of IgA production in the blood or candidates for the prophylactic or therapeutic agent of diseases caused by excessive IgA in the blood; and (2) a method of screening, comprising: cultivating small intestinal epithelial cells in the presence and absence of a test substance; comparing a result in the presence of the test substance with a result in the absence of the test substance or a result of a negative control, by using, as an index, promotion of expression of an antibacterial protein (e.g., DAO) in the intestinal innate immune system or the antibacterial protein, promotion of the activity of the antibacterial protein, an increase of reaction efficiency of the antibacterial protein, or a decrease in the number of at least one species of bacteria belonging to the group of sensitizing bacteria or an increase in the number of bacteria of genus *Lactobacillus*; evaluating a promoting effect of the expression of the antibacterial protein, a promoting effect of the activity of the antibacterial protein, or an increasing effect of reaction efficiency of the antibacterial protein by the test substance; or evaluating a decrease in the number of at least one species of bacteria belonging to the group of sensitizing bacteria or an increase in the number of bacteria of genus *Lactobacillus*; and selecting candidates for the inhibitor of IgA production in the blood or candidates for the prophylactic or therapeutic agent of diseases caused by excessive IgA in the blood.

The extent of the promoting effect for expression/activity or that of the increase of reaction efficiency is not particularly defined as long as the promotion is statistically significant, and is preferably 1.5 times or more, and more preferably two times or more relative to the expression ox activity or the reaction amount of the antibacterial protein in the absence of the test substance (e.g., prior to the administration of a test substance (e.g., wild-type) or in the negative control system).

The extent of the decrease in the number of at least one species of bacteria belonging to the group of sensitizing bacteria is not particularly defined as long as the extent is a statistically significant decrease, and the extent of the decrease is preferably ½ or less, more preferably ¼ or less, still more preferably ⅒ or less with respect to the proportion of the bacteria in the gut microbiota (e.g., highly sensitizing gut microbiota described below) in the absence of the test substance. Particularly preferably, bacteria belonging to the group of sensitizing bacteria disappear. When the number of at least one species of bacteria is decreased, the frequency of presence of the total of bacteria of the group of sensitizing bacteria in the gut microbiota is preferably 15% or less, more preferably 10% or less, and even more preferably 8% or less.

The extent of the increase in the number of bacteria of genus *Lactobacillus* is not particularly defined as long as the increase is a statistically significant increase, and the extent of the increase is preferably 1.5 times or more, more preferably two times or more, and even more preferably three times or more, relative to the proportion of the bacteria in the gut microbiota (e.g., highly sensitizing gut microbiota described below) in the absence of the test substance. When the number of bacteria belonging to genus *Lactobacillus* is increased, the frequency of presence of the bacteria belonging to genus *Lactobacillus* in the gut microbiota is 60% or more, more preferably 70% or more, and even more preferably 80% or more.

Based on base sequence information of the antibacterial protein gene of the intestinal innate immune system, it is possible to measure the expressional induction of the antibacterial protein in various human intestines even in silico. Induction of gene expression of the antibacterial protein in various human intestines can also be measured even in vivo or in vitro, for example, by utilizing a probe or a primer having a base sequence of a portion or all of the gene. Measurement of induction of gene expression of the antibacterial protein can be performed by conventional methods such as RT-PCR, Northern blot, Southern blot, and the like. Measurement of the induction of mRNA expression level of the antibacterial protein gene can also be performed by conventional methods such as RT-PCR, Northern blot, Southern blot, and the like.

When PCR is performed, primers are not particularly restricted as long as they can specifically amplify only the antibacterial protein gene, and can be appropriately set based on the sequence information of the antibacterial protein gene. For example, an oligonucleotide comprising at least consecutive 10 nucleotides of the base sequence of the antibacterial protein gene or an expression control region of the gene, and an antisense oligonucleotide having a sequence complementary to the oligonucleotide may be used as a probe or a primer. More specifically, an oligonucleotide having a base sequence of consecutive 10 to 60 residues, preferably 10 to 40 residues, in the base sequence of the antibacterial protein gene or the expression control region of the gene and an antisense oligonucleotide having a sequence complementary to the oligonucleotide can be used.

The oligonucleotide and the antisense oligonucleotide described above can be produced by conventional methods using a DNA synthesizer. The oligonucleotide or the antisense oligonucleotide may include, for example, a sense primer corresponding to the 5'-end base sequence, an antisense primer corresponding to the 3'-end base sequence, and the like in a portion of the base sequences of an mRNA to be detected. The sense primer and the antisense primer include oligonucleotides that do not change extremely in their respective melting temperatures ($T_m$) and the number of bases, such as oligonucleotides of approximately 10 to 60 bases, and preferably oligonucleotides of approximately 10 to 40 bases.

Determination of the promotion of the expression level of the antibacterial protein can be performed by conventional immune-analysis, such as western blot using antibodies, or ELISA. Specifically, it can be performed by conventional methods known to those skilled in the art as described in the Molecular Cloning Second Edition or Current Protocols in Molecular Biology, etc. Determination of activity or reaction efficiency of the antibacterial protein can be performed by any assays, such as DAO activity measurement, quantitation of reaction products, and the like. For example, measurement of DAO activity can be performed by the method described in Watanabe T., Motomura Y., Suga T. (1978) "A new colorimetric determination of D-amino acid oxidase and urate oxidase activity", Anal Biochem 86: 310e 315. Determination of the quantity of the bacteria (e.g., the frequency of presence in the gut microbiota) can be performed after extracting bacterial genomic DNA using the quantitative PCR method targeting 16s ribosome DNA.

The antibacterial protein of the intestinal innate immune system includes proteins or peptides released from intestinal epithelia as innate immune response of the intestinal tract, is responsible for the control of enteric bacteria, and is preferably DAO, defensin (α-defensin, β-defensin, etc.), cathelicidin, phospholipase D, REG3G (Regenerating islet-derived protein 3 gamma) or lysozyme, more preferably DAO or α-defensin, and particularly preferably DAO. For example, the amino acid sequence of human DAO and the amino acid sequence of mouse DAO are represented by Sequence ID Nos. 1 and 2, respectively. The method of obtaining the antibacterial protein of the intestinal innate immune system is not particularly restricted, and the protein may be a protein synthesized by chemical synthesis, a naturally derived protein isolated from a biological sample or cultured cells, or a recombinant protein produced by a genetic recombination technique.

All genes encoding the antibacterial protein of the intestinal innate immune system (e.g., DAO having an amino acid sequence represented by Sequence ID No. 1 or 2) belong to the antibacterial protein gene. For example, the base sequence of a human DAO gene and the base sequence of a mouse DAO gene are represented by Sequence ID Nos. 3 and 4, respectively. Methods for obtaining the antibacterial protein gene of the intestinal innate immune system are not particularly limited. The antibacterial protein gene can be isolated by preparing an appropriate probe or primer based on the amino acid sequence information disclosed in Sequence ID No. 1 or 2 or the base sequence information disclosed in Sequence ID No. 3 or 4, and using them to select a desired clone from a human or murine cDNA library (prepared according to a conventional method by using an appropriate cell in which the antibacterial protein gene of the intestinal innate immune system is expressed). The antibacterial protein gene can also be obtained by the PCR method. For example, PCR is performed using chromosomal DNA or cDNA library from cultured human or murine cells as a template. The reaction conditions for PCR can be set as appropriate. For example, a condition as follows can be raised, in which one cycle of reaction steps consisting of 30 seconds at 94° C. (denaturation), 30 seconds to 1 minute at 55° C. (annealing), and 2 minutes at 72° C. (elongation) is performed, for instance, by 30 cycles, followed by reaction for 7 minutes at 72° C. Amplified DNA fragments can then be cloned into an appropriate vector which is amplifiable in a host, such as E. coli. Manipulations such as preparation of a probe or a primer described above, construction of a cDNA library, screening of the cDNA library, and cloning of a gene of interest are known to those skilled in the art and can be performed according to, for example, methods described in the Molecular Cloning Second Edition, Current Protocols in Molecular Biology, and the like.

As a test substance to be subjected to the screening method according to the first embodiment, any substances can be used. The type of test substance is not particularly restricted and may be a microorganism or a component derived from a microorganism, a nucleic acid molecule, an antibody, respective small molecule synthetic compounds, a compound present in an extract of a natural product, or a synthetic peptide. Alternatively, the test compound may also be a microorganism library, a compound library, a phage display library or a combinatorial library. Construction of the microorganism library or the compound library is known to those skilled in the art, and a commercially available microorganism library or compound library can also be used. The test substance is preferably a microorganism or a component derived from microorganism (e.g., a microorganism library), a low molecular weight compound (e.g., a compound library), a nucleic acid molecule or antibody, and more preferably a microorganism or a component derived from a microorganism (e.g., enteric bacteria or a component derived from enteric bacteria), a nucleic acid molecule or antibody, in view of high specificity for the antibacterial protein gene or antibacterial protein of the intestinal innate immune system. In the screening method according to the first embodiment, the diseases caused by excessive IgA in the blood includes glomerulonephritis caused by excessive IgA in the blood, IgA vasculitis caused by excessive IgA in the blood, skin diseases caused by excessive IgA in the blood (e.g., anaphylactoid purpura), and the like. The glomerulonephritis is preferably IgA nephropathy, mesangial proliferative nephritis, or purpura nephritis. For example, with regard to IgA nephropathy, it is known that IgA deposited on the renal glomerulus induces a complement system and inflammatory cytokines, causing glomerulonephritis. It is known that this causes hematuria and proteinuria, often shifting to the introduction of dialysis via a chronic process.

<Production Inhibitor of IgA in the Blood or Prophylactic or Therapeutic Agent Against a Disease Caused by Excessive IgA in the Blood>

The production inhibitor of IgA in the blood or the prophylactic or therapeutic agent against a disease caused by excessive IgA in the blood according to the second embodiment comprises a reaction substrate for the antibacterial protein, bacteria of genus *Lactobacillus* (e.g., the gut microbiota comprising the bacteria) or an antibiotic. The reactive substrate for the antibacterial protein (e.g., DAOs) includes an amino acid and an amino acid derivative. Here, the amino acid derivative includes an amino acid in which an arbitral carbon, oxygen, nitrogen or sulfur atom constituting the amino acid is chemically modified. For example, the chemical modification includes modification by alkylation using a linear or branched alkyl group (e.g., methyl group, ethyl group, isopropyl group, etc.) with 1 to 3 carbon atoms and the like. Amino acids or amino acid derivatives are preferably D-amino acids (e.g., neutral or basic D-amino acids such as D-alanine, D-proline, D-methionine, or D-serine) or D-amino acid derivatives. Since bacteria produce a variety of D-amino acids (Lam H et al., Science; 325: 1552-1555. 2009), all or many bacterial groups of the gut microbiota can produce the reaction substrates described above. Lactic acid bacteria used as probiotics can also produce the above reaction substrates. When the inhibitor of IgA production in the blood or the prophylactic or therapeutic agent against diseases caused by excessive IgA in the blood according to the second embodiment contains the reaction substrate, from the viewpoint of the production inhibition of IgA in the blood, it is preferable to administer the reaction substrate to a patient in which expression or activity of the antibacterial protein gene or the antibacterial protein (when two or more antibacterial protein genes or antibacterial proteins exist, the expression or activity of each of them) is ½ or more of the expression or activity of a wild type or a healthy person. It is more preferable to administer the reaction substrate to a patient in which expression or activity is at least equal to the expression or activity of a wild type or a healthy person. In particular, it is preferable to administer the reaction substrate to a patient in which expression or activity of the DAO gene or DAO is ½ or more of the expression or activity of a wild type or a healthy person, and it is more preferable to administer to a patient in which expression or activity is equal to or more than the expression or activity in a wild type or a healthy person.

The antibiotic is not particularly restricted as far as the effects of the present invention can be achieved and includes, for example, ampicillin, neomycin, vancomycin, and the like. The antibiotic is preferably an antibiotic against enteric bacteria and more preferably an antibiotic against at least one species of bacteria belonging to the group of sensitizing bacteria. The form of the inhibitor of IgA production in the blood or the prophylactic or therapeutic agent against diseases caused by excessive IgA in the blood according to the second embodiment is not particularly restricted, and includes a pharmaceutical or a pharmaceutical composition, or food or a food composition (e.g., supplements, beverages, etc.), as long as the form thereof includes a reaction substrate for the antibacterial protein, bacteria of genus *Lactobacillus* or an antibiotic. The dosage regiment of the inhibitor of IgA production in the blood or the prophylactic or therapeutic agent against diseases caused by excessive IgA in the blood according to the second embodiment is not particularly defined, and the method of administration can be appropriately selected depending upon the age and symptoms of a patient. Oral administration is preferred. The dosage depends on the age, the route of administration, and the frequency of administration, and can be appropriately selected by a person skilled in the art. In oral administration, the dosage is not particularly limited and is typically in the range of 0.1 µg to 10 mg/kg body weight.

<Method of Inhibiting Production of IgA in the Blood of Individual>

The method of inhibiting production of IgA in the blood of an individual (except for a human) according to the third embodiment comprises promoting gene expression of the antibacterial protein in the intestinal innate immune system, promoting expression or activity of the antibacterial protein, and administering a reaction substrate for the antibacterial protein, bacteria belonging to genus *Lactobacillus* or an antibiotic. The individual includes an individual organism, preferably an animal, and more preferably a mammal. The mammal includes rodents (e.g., mice, rats) and the like. The present embodiment is also applicable to a human individual. The method of promoting the expression of the antibacterial protein gene or the antibacterial protein includes administration of (+)-5-methyl-10,11-dihydro-5 H-dibenzo(a,d)cycloheptene-5,10-imine (MK-801), a ketamine, morphine, an MAPK/Erk signal inhibitor (such as PD98059), or poly (IC) (see references 1)-5) below).

1) Hashimoto A, Yoshikawa M, Andoh H, Yano H, Matsumoto H, Kawaguchi M, Oka T, Kobayashi H. Effects of MK-801 on the expression of serine racemase and d-amino acid oxidase mRNAs and on the D-serine levels in rat brain. Eur J Pharmacol. 2007 Jan. 19; 555(1): pp. 17-22. Epub 2006 Oct. 10. PubMed PMID:17109841.
2) Takeyama K, Yoshikawa M, Oka T, Kawaguchi M, Suzuki T, Hashimoto A. Ketamine enhances the expression of serine racemase and D-amino acid oxidase mRNAs in rat brain. Eur J Pharmacol. 2006 Jul. 1; 540 (1-3):82-6. Epub 2006 Apr. 28. PubMed PMID: 16716293.
3) Yoshikawa M, Shinomiya T, Takayasu N, Tsukamoto H, Kawaguchi M, Kobayashi H, Oka T, Hashimoto A. Long-term treatment with morphine increases the D-serine content in the rat brain by regulating the mRNA and protein expressions of serine racemase and D-amino acid oxidase. J Pharmacol Sci. 2008 July; 107(3):270-6. Epub 2008 Jul. 5. PubMed PMID: 18603832.
4) Nagai T, Yu J, Kitahara Y, Nabeshima T, Yamada K. D-Serine ameliorates neonatal PolyI:C treatment-induced emotional and cognitive impairments in adult mice. J Pharmacol Sci. 2012; 120(3):213-27. Epub 2012 Oct. 26. PubMed PMID: 23099320.
5) Sasabe J, Miyoshi Y, Suzuki M, Mita M, Konno R, Matsuoka M, Hamase K, Aiso S. D-Amino acid oxidase controls motoneuron degeneration through D-serine. Proc Natl Acad Sci USA. 2012; 109(2): pp. 627-32. Epub 2011 Dec. 27. PubMed PMID: 22203986.

The method of promoting the activity of the antibacterial protein includes a method of allowing a flavin, a flavin adenine dinucleotide (FAD), a DAO activating factor (DAO activator: also known as G72 protein) and the like to act. The extent of the promotion in the third embodiment is the same as the extent of the promotion in the first aspect. The detection of the gene expression of the antibacterial protein, the measurement of the mRNA expression level of the antibacterial protein, the measurement of the expression level of the antibacterial protein, and the measurement of the activity of the antibacterial protein in the third embodiment are the same as the methods in the first embodiment.

The method of administering a reaction substrate for the antibacterial protein, bacteria of genus *Lactobacillus* or an antibiotic includes, (a) a method of orally administering a reactive substrate (e.g., a D-amino acid or a D-amino acid derivative), bacteria belonging to genus *Lactobacillus* or an antibiotic as a pharmaceutical or a pharmaceutical composition, or a food or a food composition, and (b) a method of administering (e.g., orally administrating) a D-amino acid which becomes a substrate for DAO, bacteria of genus *Lactobacillus*, or an antibiotic. Specific examples and preferred examples of the antibiotics are as described above.

When administering a reaction substrate for the antibacterial protein, it is preferable to administer the reaction substrate to an individual in which expression or activity of the antibacterial protein gene or the antibacterial protein (when two or more antibacterial protein genes or antibacterial proteins exist, the expression or activity of each of them) is ½ or more of the expression or activity of a healthy individual (e.g., wild type). It is more preferable to administer the reaction substrate to an individual in which expression or activity is at least equal to the expression or activity of a healthy individual (e.g., wild type), from the viewpoint of the inhibition of IgA production in the blood. In particular, it is preferable to administer to an individual in which expression or activity of a DAO gene or DAO is ½ or more of the expression or activity of a healthy individual (e.g., wild type), and it is more preferable to administer to an individual in which expression or activity of a DAO gene or DAO is at least equal to the expression or activity of a healthy individual (e.g., wild type). It is also preferable to administer to an individual in which DAO activity is 10 or more, preferably 20 or more, in a histotripsy solution (e.g., renal histotripsy) indicated by an absorbance of 550 nm in the colorimetric method described in, for example, Watanabe T, Motomura Y, Suga T (1978) A new colorimetric determination of D-amino acid oxidase and urate oxidase activity. Anal Biochem 86: 310e 315.

The dosage regimen of administration of the reaction substrate, the enteric bacteria or the antibiotic is not particularly limited and may be chosen as appropriate depending upon the age and symptoms of the individual. Oral administration is preferred. The dosage depends on the age, the route of administration, and the frequency of administration, and can be appropriately selected by a person skilled in the art. When administered orally, the dosage is not particularly limited and is generally in the range of 0.1 µg to 10 mg/kg body weight.

<Method of Screening for Promoting Agent of IgA Production in the Blood>

The method of screening for a promoting agent of IgA production in the blood according to the fourth embodiment uses inhibition of gene expression of the antibacterial protein in the intestinal innate immune system, inhibition of expression or activity of the antibacterial protein, or an increase in the number of at least one species of bacteria belonging to the group of sensitizing bacteria or a decrease in the number of bacteria of genus *Lactobacillus*, as an index. In the fourth embodiment, screening refers to at least narrowing population of test substances by administering a test substance to an organism (e.g., animals) or small intestinal epithelial cells and using inhibition of gene expression of the antibacterial protein in the intestinal innate immune system or inhibition of expression or activity of the antibacterial protein, as an index. It is preferred to select candidates for the promoting agent of IgA production in the blood. It is preferable that the screening method according to the fourth embodiment comprises evaluating an inhibiting effect of the gene expression of the antibacterial protein or an inhibiting effect of the expression or activity of the antibacterial protein by the test substances administered; or evaluating an increase in the number of at least one species of bacteria belonging to the group of sensitizing bacteria or a decrease in the number of bacteria belonging to genus *Lactobacillus*; and selecting candidates for the promoting agent of IgA production in the blood. The screening method may be any screening method, such as in vivo screening, in vitro screening, or in silico screening, as long as the above is used as an index. Preferred examples of screening methods according to the fourth embodiment include the following:

(1) a method of screening, comprising: administering a test substance to an organism (e.g., an animal); comparing a result of the administration of the test substance with a result of non-administration or a result of a negative control, by using, as an index, inhibition of gene expression of an antibacterial protein in the intestinal innate immune system or the antibacterial protein, inhibition of the activity of the antibacterial protein, or an increase in the number of at least one species of bacteria belonging to the group of sensitizing bacteria or a decrease in the number of bacteria of genus *Lactobacillus*; evaluating an inhibiting effect of the gene expression of the antibacterial protein or an inhibiting effect of the expression or activity of the antibacterial protein by the test substance; or evaluating an increase in the number of at least one species of bacteria belonging to the group of sensitizing bacteria or a decrease in the number of bacteria of genus *Lactobacillus*; and selecting candidates for the production inhibitor of IgA in the blood; and (2) a method of screening, comprising: cultivating small intestinal epithelial cells in the presence or absence of a test substance; comparing a result in the presence of the test substance with a result in the absence of the test substance or a result of a negative control, by using, as an index, inhibition of gene expression of an antibacterial protein in the intestinal innate immune system or the antibacterial protein, inhibition of the activity of the antibacterial protein, or an increase in the number of at least one species of bacteria belonging to the group of sensitizing bacteria or a decrease in the number of bacteria of genus *Lactobacillus*; evaluating an inhibiting effect of the gene expression of the antibacterial protein or an inhibiting effect of the expression or activity of the antibacterial protein, or an increase in the number of at least one species of bacteria belonging to the group of sensitizing bacteria or a decrease in the number of bacteria of genus *Lactobacillus*; and selecting candidates for the production inhibitor of IgA in the blood. The extent of inhibition is not particularly defined as long as it is a statistically significant inhibition, but the extent of inhibition is preferably ½ or less, more preferably ¼ or less, still more preferably ¹⁄₁₀ or less with respect to the expression or activity of the antibacterial protein gene or the antibacterial protein in the absence of the test substance (e.g., a system prior to administration of the test substance or a system of a negative control). Particularly preferably, expression or activity disappears.

The extent of the increase in the number of at least one species of bacteria belonging to the group of sensitizing bacteria is not particularly limited as long as the extent is a statistically significant increase, and the extent of the increase is preferably two times or more, more preferably three times or more with respect to the proportion of the bacteria in the gut microbiota (e.g., poorly sensitizing gut microbiota described below) in the absence of the test substance. When the number of at least one species of bacteria is increased, the frequency of presence of the total of bacteria of the group of sensitizing bacteria in the gut microbiota is preferably 30% or more, more preferably 40% or more, and even more preferably 45% or more.

The extent of the decrease in the number of bacteria of genus *Lactobacillus* is not particularly limited as long as the decrease is statistically significant, and the extent of the decrease is preferably ½ or less, more preferably ⅓ or less, relative to the proportion of the bacteria in the gut microbiota (e.g., poorly sensitizing gut microbiota described below) in the absence of the test substance. When the number of bacteria belonging to genus *Lactobacillus* is decreased, the frequency of presence of the bacteria belonging to genus *Lactobacillus* in the gut microbiota is preferably 50% or less, more preferably 45% or less, and even more preferably 40% or less.

The detection of the gene expression of the antibacterial protein, the measurement of the mRNA expression level of the antibacterial protein, the measurement of the expression level of the antibacterial protein, the activity inhibition of the antibacterial protein, and the measurement of the bacteria in the fourth embodiment are the same as the methods in the first embodiment. The test substance to be subjected to the screening method according to the fourth embodiment includes a test substance similar to the test substance listed as the test substance to be subjected to the screening method according to the first aspect, and also includes a substance having an antibacterial effect on microorganisms (e.g., an antibiotic).

<Method of Promoting IgA Production in the Blood of Individual>

The method of promoting IgA production in the blood of an individual (except for a human) comprises inhibiting gene expression of the antibacterial protein of the intestinal innate immune system, inhibiting expression or activity of the antibacterial protein, or administering at least one species of bacteria belonging to the group of sensitizing bacteria. The individual in the fifth embodiment includes an individual described above in the third aspect. The present embodiment is also applicable to a human individual. The extent of the inhibition or the extent of the increase or decrease in the number of bacteria in the fifth embodiment is the same as the extent of the inhibition or the extent of the increase or decrease in the number of bacteria in the fourth embodiment. In the method according to the fifth embodiment, the method of inhibiting the gene expression of the antibacterial protein in the intestinal innate immune system or the antibacterial protein includes, for example, a method of destroying or mutating partially or wholly a base sequence encoding the antibacterial protein of the intestinal innate immune system (knockout). The method of destroying or mutating partially or wholly a base sequence encoding the antibacterial protein of the intestinal innate immune system includes any method known to those skilled in the art, such as chemical synthesis, a genetic engineering means, or mutagenesis. Specifically, the method can be performed by using a method of contacting DNA encoding the antibacterial protein with a mutagen drug so that the drug acts on the DNA, irradiation with UV rays, a genetic engineering means, and the like. Site-directed mutagenesis, one type of genetic engineering means, is useful because it is a means capable of introducing a specific mutation at a specific position, and can be performed according to the method described in Molecular Cloning, Second Edition, Current Protocols in Molecular Biology, and the like. For example, among the amino acid sequences encoding DAO, mutation of glycine at position 181 to arginine can abolish the activity of DAO and such mutation can be subject to autosomal recessively inheritance. An individual of recessive homozygote is hereinafter referred to as a "DAO activity-deficient mouse" (Konno R. and Yasumura Y., Genetics 103: pp. 277-285 (1983), Hashimoto A., Yoshikawa M., Niwa A. and Konno R., Brain Res. 1033: 210-215 (2005)). Further, to inhibit the expression of the above protein, a method of administering an NF-kB inhibitor (caffeic acid phenethyl ester (CAPE) and the like) can be mentioned. The means of inhibiting the activity of the antibacterial protein of the intestinal innate immune system includes administering a competitive inhibitor (such as 6-chloro-3-hydroxy-1,2-benzisoxazole (CBIO)) to the antibacterial protein substrate.

<Method of Assessing Risk, Severity or State of Diseases Caused by Excessive IgA in the Blood>

The method of assessing risk, severity or state of diseases caused by excessive IgA in the blood according to the sixth embodiment is performed based on frequency of presence of enteric bacteria that produces a reaction substrate for the antibacterial protein in a gut microbiota of an individual with lowered gene expression of the antibacterial protein in the intestinal innate immune system or an individual with lowered expression or activity of the antibacterial protein. The extent of the decrease in the gene expression of the antibacterial protein or decrease in the expression or activity of the antibacterial protein in the individual in the sixth embodiment is not particularly limited as long as the decrease is a statistically significant decrease, and the extent of the decrease is preferably ½ or less, more preferably ⅓ or less, and even more preferably ¼ or less, with respect to the expression, activity, or reaction amount of the antibacterial protein gene or the antibacterial protein in a healthy individual (e.g., wild type) (when two or more species of the antibacterial protein gene or the antibacterial protein exist, with respect to the expression, activity, or reaction amount of each of them). In particular, the extent of the decrease is preferably ½ or less, more preferably ⅓ or less, and still more preferably ¼ or less with respect to the expression, activity, or reaction amount of a DAO gene or DAO in a healthy individual (e.g., wild type). The Detection of the gene expression of the antibacterial protein, the measurement of the mRNA expression level of the antibacterial protein, the measurement of the expression level of the antibacterial protein, and the measurement of the activity promotion of the antibacterial protein in the individual in the sixth embodiment are the same as the methods in the first embodiment.

The method of measuring the frequency of presence of the enteric bacteria includes a method comprising extracting bacterial genomic DNA in the gut microbiota, PCR-amplifying 16s ribosomal DNA as a target, and analyzing the quantity of various bacteria (e.g., the frequency of presence accounting for the gut microbiota) by next-generation sequencer analysis. When the frequency of presence of at least one species of bacteria belonging to the group of sensitizing bacteria is 5% or more, the risk of the disease caused by excessive IgA in the blood can be assessed to be high, and the degree or condition of the disease can be assessed to have progressed. When the frequency of presence is 10% or more, the risk can be assessed to be higher and the degree or condition can be assessed to have become more serious. When the frequency of presence is 15% or more, the risk of the disease can be assessed to be even higher, and the degree or condition of the disease can be assessed to have become even more serious. On the other hand, when the frequency of presence of at least one species of bacteria belonging to the group of sensitizing bacteria is less than 5%, the risk of a disease caused by excessive IgA in the blood can be assessed to be low and the degree or condition of the disease can be assessed as not having progressed. When the frequency of presence is 3% or less, the risk can be assessed to be lower and the degree or condition of the disease can be assessed as not having particularly progressed. When the frequency of presence is 1% or less, the risk can be assessed to be the lowest, and the degree or condition of the disease can be assessed as having progressed at the lowest degree.

<Method of Presenting at Least One Species Selected from the Group Consisting of Enteric Bacteria to be Removed and Enteric Bacteria to be Administered to Prevent or Treat Diseases Caused by Excessive IgA in the Blood>

The method of presenting at least one species selected from the group consisting of enteric bacteria to be removed and enteric bacteria to be administered to prevent or treat diseases caused by excessive IgA in the blood according to the seventh embodiment comprises presenting at least one species selected from the group consisting of enteric bacteria to be removed and enteric bacteria to be administered to prevent or treat diseases caused by excessive IgA in the blood, based on the frequency of presence of enteric bacteria that produces a reaction substrate for an antibacterial protein in a gut microbiota of an individual with lowered gene expression of the antibacterial protein in the intestinal innate immune system or an individual with lowered expression or activity of the antibacterial protein. The extent of the decrease in the gene expression of the antibacterial protein or the decrease in the expression or activity of the antibacterial protein of the individual in the seventh embodiment is the same as the method in the sixth embodiment. The detection of the gene expression of the antibacterial protein, the measurement of mRNA expression level of the antibacterial protein, the measurement of the expression level of the antibacterial protein, and the measurement of the activity promotion of the antibacterial protein in the individual in the seventh embodiment are the same as the methods in the first embodiment.

EXAMPLES

Although the present invention is described more specifically with reference to the Example below, the scope of the present invention is not limited to these Examples.

<Comparison of Plasma IgA Levels in Wild-Type and DAO Activity-Deficient Mice>

Hereinafter, as DAO activity-deficient mice, naturally occurring DAO activity-deficient mice ($DAO^{G181R/G181R}$ mouse) were genetically purified by backcrossing with mice (C57BL/6 mouse) and the obtained mice were used. From a tail of each of wild-type mice (C57BL/6 mouse) and DAO activity-deficient mice, 50 μl of blood was collected and plasma IgA levels were measured using the ELISA (Mouse IgA Ready Set Go!: manufactured by Affimetrics) method. Administration of antibiotics were performed by allowing the mice to drink the water containing antibiotics (ampicillin 1 g/L, neomycin 1 g/L and vancomycin 0.5 g/L) freely for 3 weeks. The control groups had free access to water. Quantification of the amount of intestinal bacteria before and after administration of the antibiotics was performed by extracting bacterial genomic DNA in feces and using quantitative PCR targeting conserved region of 16s ribosomal DNA.

Figure 1:
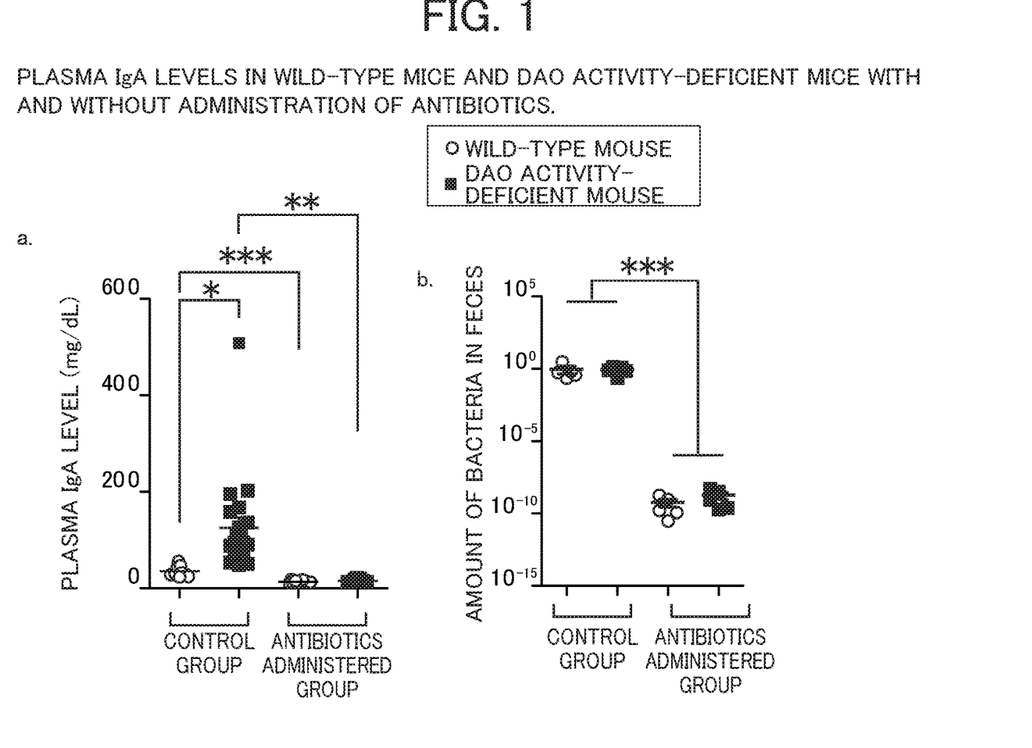
FIG. 1 is a drawing showing that plasma IgA induced by the gut microbiota is quantitatively regulated by DAO.

FIG. 1A is a drawing showing plasma IgA levels in wild-type mice and DAO activity-deficient mice under conditions with and without administration of antibiotics. FIG. 1B is a drawing showing results of comparison of bacteria amounts in feces before and after the administration of antibiotics by quantitative PCR method. In FIGS. 1A and 1B, * indicates significance level $p<0.05$,  indicates significance level $p<0.01$, and * indicates significance level $p<0.001$. As can be seen from FIGS. 1A and 1B, it is found that when comparing the plasmas of the wild-type mice with those of the DAO activity-deficient mice, IgA was significantly higher in the DAO activity-deficient mice. Furthermore, under conditions in which the gut microbiota was markedly reduced by the administration of antibiotics, difference in the IgA contents between the wild-type mice and the DAO activity-deficient mice disappeared, indicating that the DAO is involved in IgA induction by the gut microbiota.

Following administration of the antibiotics, a gut microbiota which had a composition shown in Table 1 below and which had a relatively high immune sensitizing potential (hereafter referred to simply as "highly sensitizing gut microbiota") was transplanted into the wild-type mice and the DAO activity-deficient mice. Highly sensitizing gut microbiotas were obtained from wild-type mice owned by Keio University.

TABLE 1

| | |
|---|---|
| p_Firmicutes;c_Bacilli;o_Lactobacillales;f_Lactobacillaceae;g_Lactobacillus | 36.7352 |
| p_Firmicutes;c_Erysipelotrichi;o_Erysipelotrichales;f_Erysipelotrichaceae;g_Allobaculum | 17.2811 |
| p_Firmicutes;c_Bacilli;o_Turicibacterales;f_Turicibacteraceae;g_Turicibacter | 11.6519 |
| p_Bacteroidetes;c_Bacteroidia;o_Bacteroidales;f_S24-7;g_ | 5.6662 |
| p_Proteobacteria;c_Deltaproteobacteria;o_Desulfovibrionales;f_Desulfovibrionaceae;g_Desulfovibrio | 4.3533 |
| p_Firmicutes;c_Clostridia;o_Clostridiales;f_;g_ | 4.0506 |
| p_Firmicutes;c_Clostridia;o_Clostridiales;f_Clostridiaceae;g_Candidatus Arthromitus | 3.5035 |
| p_Firmicutes;c_Bacilli;o_Lactobacillales;f_Streptococcaceae;g_Streptococcus | 3.5001 |
| p_Proteobacteria;c_Gammaprobacteria;o_Oceanospirllales;f_Halomonadaceae;g_ | 2.9330 |
| p_Actinobacteria;c_Coriabacterila;o_Coriobacteriales;f_Corlobacteriaceae;g_ | 2.5727 |
| p_Cyanobacteria;c_Chloroplast;o_Streptophyta;f_;g_ | 2.3854 |
| p_Firmicutes;c_Clostridia;o_Clostridiales;f_Lachnospiraceae;g_[Ruminococcus] | 1.6352 |
| p_Firmicutes;c_Clostridia;o_Clostridiales;f_Eubacteriaceae;g_Pseudramibacter_Eubacterium | 1.2116 |
| p_Actinobacteria;c_Actinobacteia;o_Bifidobacteriales;f_Bifidobacteriaceae;g_Bifidobacterium | 0.8109 |
| p_Bacteroidetes;c_Bacteroidia;o_Bacteroidales;f_Prevotllaceae;g_Prevotella | 0.3029 |
| p_Actinobacteria;c_Coriobacterila;o_Coriobacteriales;f_Coriobacteriaceae;g_Adlercreutzia | 0.2683 |
| p_Firmicutes;c_Clostridia;o_Clostridiales;f_Lachnospiraceae;g_ | 0.1676 |
| p_Firmicutes;c_Clostridia;o_Clostridiales;f_Clostridiaceae;g_ | 0.1494 |
| p_Firmicutes;c_Clostridia;o_Clostridiales;f_Ruminococcaceae;g_Ruminococcus | 0.1437 |
| p_Proteobacteria;c_Betaproteobacteria;o_Burkholderiales;f_Alcaligenaceae;g_Sutterella | 0.1384 |
| p_Firmicutes;c_Clostridia;o_Clostridiales;f_Lachnospiraceae;g_Dorea | 0.1288 |
| p_Firmicutes;c_Clostridia;o_Clostridiales;f_Peptostreptococcaceae;g_Peptostreptococcus | 0.1110 |
| p_Verrucomicrobia;c_Verrucomicrobiae;o_Verrucomicrobiales;f_Verrucomicrobiaceae;g_Akkermansia | 0.0891 |
| p_Firmicutes;c_Clostidia;o_Clostridiales;f_Veillonellaceae;g_Megasphaera | 0.0648 |
| p_Firmicutes;c_Erysipelotrichi;o_Erysipelotrichales;f_Erysipelotrichaceae;g_ | 0.0646 |
| p_Firmicutes;c_Bacilli;o_Lactobacillales;f_Leuconostocaceae;g_Weissella | 0.0589 |
| p_Firmicutes;c_Bacilli;o_Bacillales;f_Staphylococcaceae;g_Staphylococcus | 0.0113 |
| p_Firmicutes;c_Clostridia;o_Clostridiales;f_Ruminococcaceae;g_ | 0.0033 |
| p_Bacteroidetes;c_Bacteroidia;o_Bacteroidales;f_Prevotellaceae;g_ | 0.0030 |
| p_Firmicutes;c_Bacilli;o_Bacillales;f_Staphylococcaceae;g_Jeotgalicoccus | 0.0026 |
| p_Firmicutes;c_Clostridia;o_Clostridiales;f_Lachnospiraceae;g_Coprococcus | 0.0012 |
| Total (%) | 100.0000 |

Figure 2:
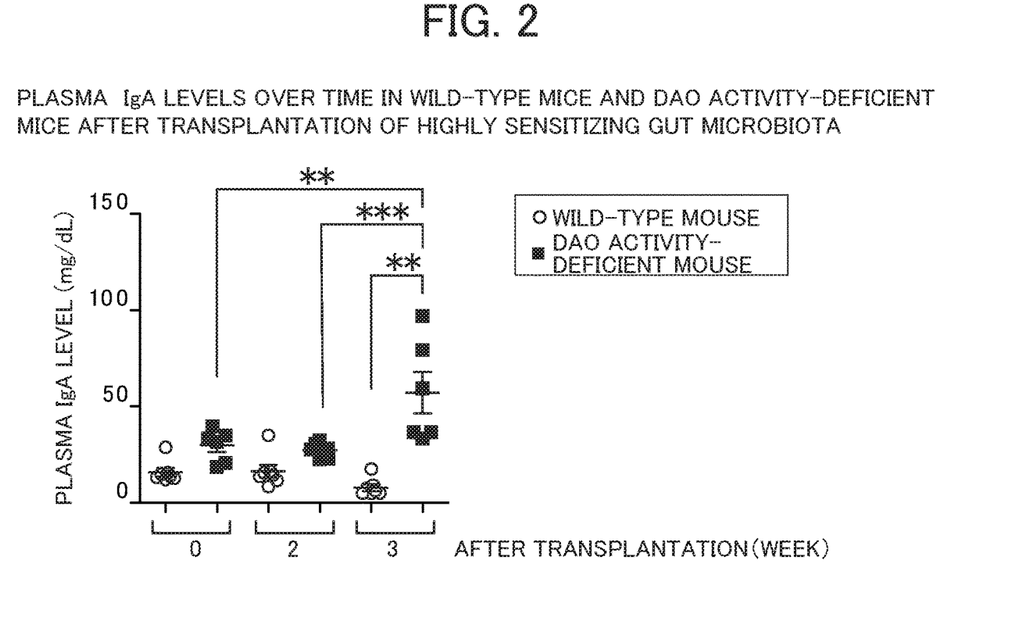
FIG. 2 is a drawing showing time course in which the sensitizing gut microbiota increases plasma IgA levels in a DAO activity-dependent manner.

Results are indicated in FIG. 2. FIG. 2 is a drawing showing plasma IgA levels in the wild-type mice and the DAO activity-deficient mice at 0, 2 and 3 weeks after the transplantation of highly sensitizing gut microbiotas after the administration of antibiotics. In FIG. 2,  indicates significance level $p<0.01$, and * indicates significance level $p<0.001$. As can be seen from FIG. 2, it is found that it took 3 weeks for the highly sensitizing gut microbiota to induce plasma IgA in the DAO activity-deficient mice. In other words, it can be understood that inhibition of the expression of an antimicrobial protein (e.g., DAO) gene of the innate immune system, inhibition of the expression or activity of the antibacterial protein, or an increase in the number of at least one species of bacteria belonging to the group of sensitizing bacteria can promote IgA production in the blood. The above results are considered to indicate that when the reaction between D-amino acids derived from gut bacteria and intestinal DAO is attenuated on the mucosal surface due to deficient activity of DAO, IgA in the mucosa and blood increases.

<Difference in Plasma IgA Inducibility in a DAO Activity-Dependent Manner Due to Difference in Types of Gut Microbiota>

Wild-type mice and DAO activity-deficient mice were raised for eight weeks in two types of enteric bacteria environment: a gut microbiota which had a composition shown in Table 2 below and which had relatively low immune sensitization (hereinafter referred to simply as "poorly sensitizing gut microbiota") and the highly sensitizing gut microbiota. The poorly sensitizing gut microbiota was obtained from mice produced by Clea Japan Inc. Additionally, the compositions of the microbiota present in the small intestinal contents were analyzed by extracting bacterial genomic DNA from small intestinal contents, PCR-amplifying 16s ribosomal DNA as a target, and analyzing sequences by using the next-generation sequencer.

TABLE 2

| | |
|---|---|
| p_Firmicutes;c_Bacilli;o_Lactobacillales;f_Lactobacillaceae;g_Lactobacillus | 93.1646 |
| p_Firmicutes;c_Bacilli;o_Turicibacterales;f_Turicibacteraceae;g_Turicibacter | 2.9421 |
| p_Bacteroidetes;c_Bacteroidia;o_Bacteroidales;f_S24-7;g_ | 1.0774 |
| p_Firmicutes;c_Clostridia;o_Clostridiales;f_;g_ | 0.9768 |
| p_Bacteroidetes;c_Bacteroidia;o_Bacteroidales;f_Prevotellaceae;g_Prevotella | 0.9283 |
| p_Firmicutes;c_Costridia;o_Clostridiales;f_Lachnospiraceae;g_[Ruminococcus] | 0.3240 |
| p_Firmicutes;c_Costridia;o_Clostridiales;f_Ruminococcaceae;g_Ruminococcus | 0.2410 |
| p_Firmicutes;c_Costridia;o_Clostridiales;f_Lachnospiraceae;g_ | 0.1948 |
| p_Proteobacteria;c_Gammaproteobacteria;o_Oceanospirillales;f_Halomonadeceae;g_ | 0.0388 |
| p_Firmicutes;c_Bacilli;o_Lactobacillales;f_Streptococcaceae;g_Streptococcus | 0.0379 |
| p_Firmicutes;c_Erysipelotrichi;o_Erysipelotrichales;f_Erysipelotrichaceae;g_ | 0.0290 |
| p_Firmicutes;c_Clostridia;o_Clostridiales;f_Clostridiaceae;g_Candidatus Arthromitus | 0.0125 |
| p_Firmicutes;c_Clostridia;o_Clostridiales;f_Ruminococcaceae;g_ | 0.0124 |
| p_Firmicutes;c_Clostridia;o_Clostridiales;f_Lachnospiraceae;g_Coprococcus | 0.0100 |
| p_Firmicutes;c_Clostridia;o_Clostridiales;f_Clostridiaceae;g_ | 0.0078 |
| p_Firmicutes;c_Erysipelotrichi;o_Erysipelotrichales;f_Erysipelotrichaceae;g_Allobaculum | 0.0012 |
| p_Bacteroidetes;c_Bacteroidia;o_Bacteroidales;f_Prevotellaceae;g_ | 0.0011 |
| p_Firmicutes;c_Bacilli;o_Bacillales;f_Staphylococcaceae;g_Staphylococcus | 0.0002 |
| p_Cyanobacteria;c_Chloroplast;o_Streptophyta;f_;g_ | 0.0002 |
| Total (%) | 100.0000 |

In the table above, p, c, o, f, and g indicate bacterial taxonomic names at phylum level, class level, order level, family level, and genus level, respectively.

Figure 3:
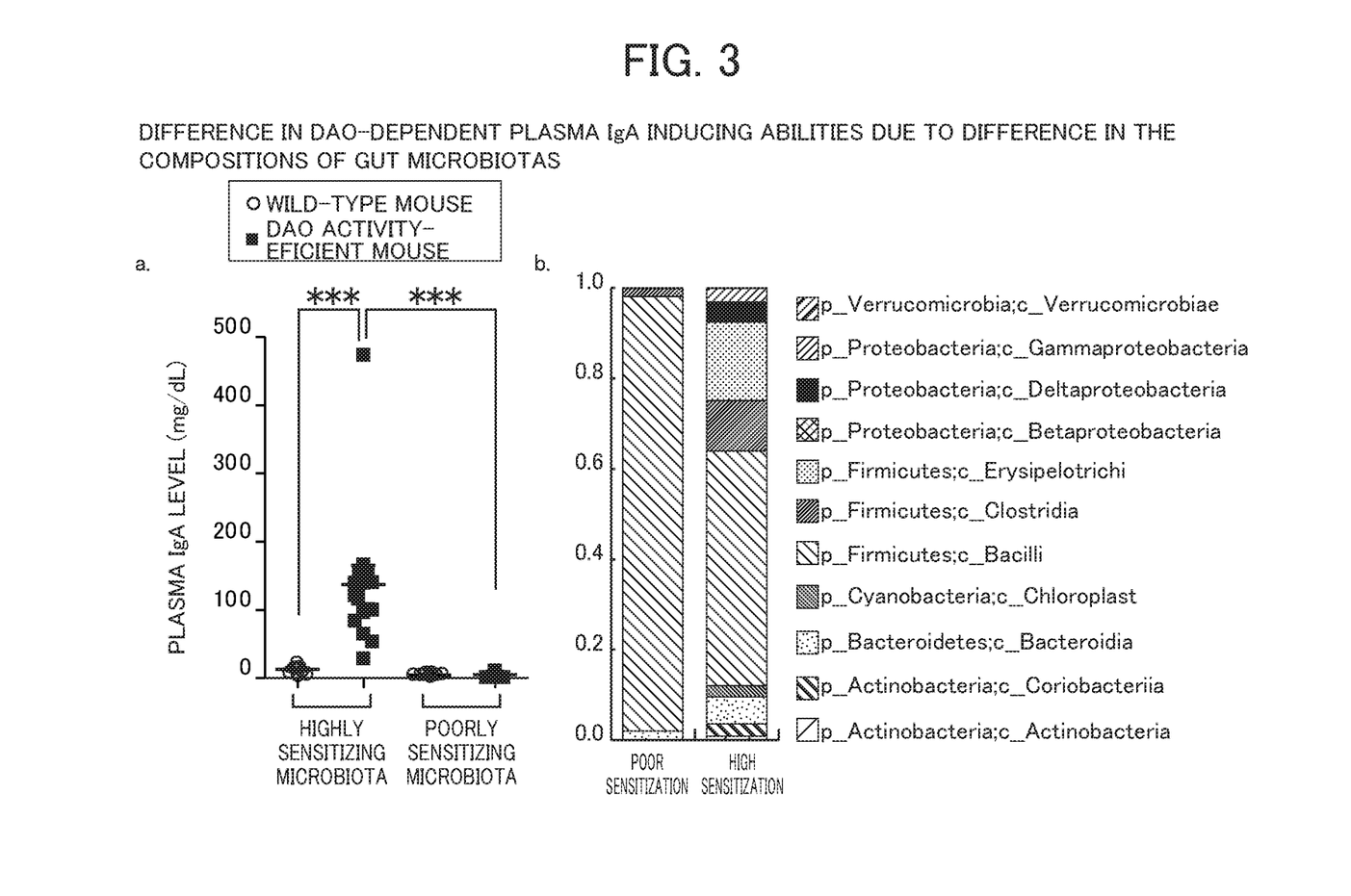
FIG. 3A is a drawing showing that sensitization of the gut microbiota affects DAO activity-dependent change in plasma IgA levels.
FIG. 3B is a drawing showing the composition (class level) of highly and poorly sensitizing gut microbiotas.

The results are indicated in FIGS. 3A and 3B. FIG. 3A is a drawing showing the results of plasma IgA levels of these mice. In FIG. 3A, * indicates significance level $p<0.001$. FIG. 3B is a drawing showing the results of the analysis. The composition of intestinal microbiota of wild-type mice having a poorly sensitizing gut microbiota and the composition of intestinal microbiota of wild-type mice having a highly sensitizing gut microbiota are indicated at phylum and class levels. In FIG. 3B, p and c indicate bacterial taxonomic names at the phylum and class levels. The results shown in FIG. 3** indicate that IgA was induced by a certain group of gut microbiota (within highly sensitizing gut microbiota) in a DAO activity-dependent manner. In addition, bacterial genera that are significantly rich (significance level of $p<0.05$) in the highly sensitizing gut microbiota compared to the poorly sensitizing gut microbiota are listed in Table 3 below.

TABLE 3

Bacteria significantly rich in highly sensitizing environment bacteria

| Phylum | Class | Order | Family | Genus |
|---|---|---|---|---|
| Actinobacteria | Actinobacteria | Bifidobacteriales | *Bifidobacteriaceae* | *Bifidobacterium* |
| | Coriobacteriia | Coriobacterales | *Coriobacteriaceae* | |
| | | | | *Adlercreutzia* |

TABLE 3-continued

Bacteria significantly rich in highly sensitizing environment bacteria

| Phylum | Class | Order | Family | Genus |
|---|---|---|---|---|
| Bacteroidetes | Bacteroidia | Bacteroidales | S24-7 | |
| Cyanobacteria | Chloroplast | Streptophyta | | |
| Firmicutes | Bacilli | Bacillales | Staphylococcaceae | Jeotgalicoccus |
| | | Lactobacillales | Leuconostocaceae | Weissella |
| | | | Streptococcaceae | Streptococcus |
| | | Turicibacterales | Turicibacteraceae | Turicibacter |
| | Clostridai | Clostridiales | Clostridiaceae | |
| | | | | Candidatus Arthromitus |
| | | | Eubacteriaceae | Pseudoramibacter_Eubacterium |
| | | | Lachnospiraceae | |
| | | | | Dorea |
| | | | | [Ruminococcus] |
| | | | Peptostreptococcaceae | Peptostreptococcus |
| | | | Veillonellaceae | Megasphaera |
| | Erysipelotrichi | Erysipelotrichales | Erysipelotrichaceae | |
| | | | | Allobaculum |
| Proteobacteria | Betaproteobacteria | Burkholderiales | Alcaligenaceae | Sutterella |
| | Deltaprobacteria | Desulfovibrionales | Desulfovibionaceae | Desulfovibrio |
| | Gammaprobeobacteria | Oceanospirillales | Halomonadaceae | |
| Verrucomicrobia | Verrocomicrobiae | Verrucomicrobiales | Verrucomicrobiaceae | Akkermansia |

Bacteria in blank cells are not identified.

As described above, attenuation of the reaction between D-amino acids derived from the gut microbiota containing the bacterial genera described in Table 3 above (from, in particular, at least one species of bacteria selected from the group consisting of genus Allobaculum, genus Turicibacter, family S24-7 of order Bacteroidales, genus Desulfovibrio, order Clostridiales, genus Streptococcus, family Halomonadaceae, order Streptophyta, and family Coriobacteriaceae) and DAO is considered to result in an increase in IgA in the mucosa and blood.

On the other hand, increasing the ratio of the bacteria belonging to genus Lactobacillus in the gut microbiota is considered to be able to inhibit the production of IgA in the mucosa and blood. That is, bacteria belonging to genus Lactobacillus are considered to be able to function as a component of an inhibitor for blood IgA production or a prophylactic or therapeutic agent for diseases caused by excessive IgA in the blood.

<Involvement of Blood Cell DAO Expression in IgA Production by Bone Marrow Transplantation>

Figure 4:
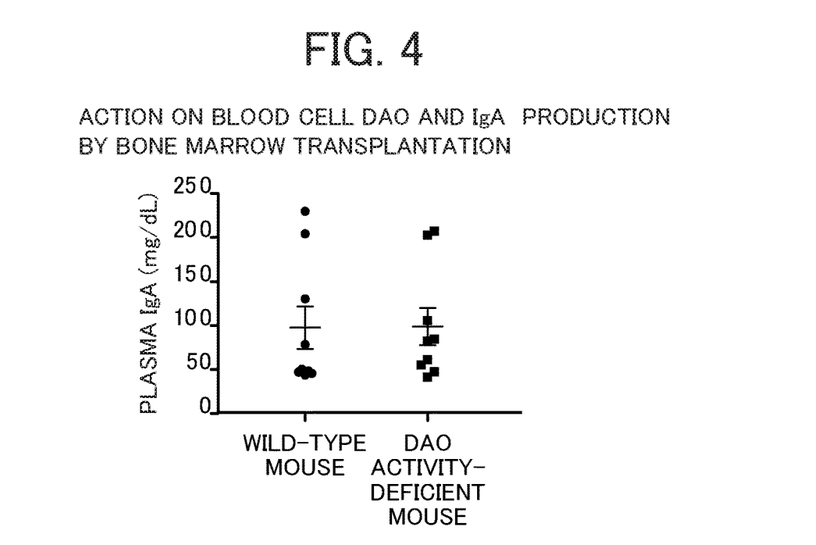
FIG. 4 is a drawing showing no association of blood cell DAO expression with IgA production by bone marrow transplantation.

Bone marrow derived from wild-type mice or bone marrow derived from DAO activity-deficient mice were transplanted to wild-type mice. From a tail of each of wild-type mice transplanted with bone marrow derived from wild-type mice and wild-type mice transplanted with bone marrow derived from DAO activity-deficient mice, 50 µl of blood was collected and plasma IgA levels were measured using the ELISA (Mouse IgA Ready Set Go!: manufactured by Affimetrics) method. The results are shown in FIG. 4. As is clear from the results shown in FIG. 4, there was no significant difference in plasma IgA levels between the wild-type mice transplanted with bone marrow derived from wild-type mice and wild-type mice transplanted with bone marrow derived from DAO activity-deficient mice. Although the expression of DAO is known to be in the cerebellum, kidney, small intestine, and leukocytes, it is known that a primary tissue for IgA production in the body is the mucosal epithelium of the intestinal tract under the environment of contact with bacteria. Indeed, it was confirmed that the number of IgA-producing cells in the small intestine increased in the DAO activity-deficient mice, and IgA released into the intestinal lumen increased (e.g., Non-Patent Document 1). On the other hand, because the kidney is under a sterile environment except for factors such as infectious pyelonephritis, renal DAO is unlikely to be in a direct causal relation with the production of IgA. Therefore, deficiency in the activity of DAO in the intestinal tract (in particular, in the small intestine where the DAO expression is observed) may be the main cause of an increase in the IgA production. These results strongly suggest that DAO expressed in the bone marrow tissue is irrelevant with the induction of IgA, and that small intestinal DAO is involved in the IgA production.

<DAO Activity in Spontaneous IgA Nephropathy Model Mice>

Figure 5:
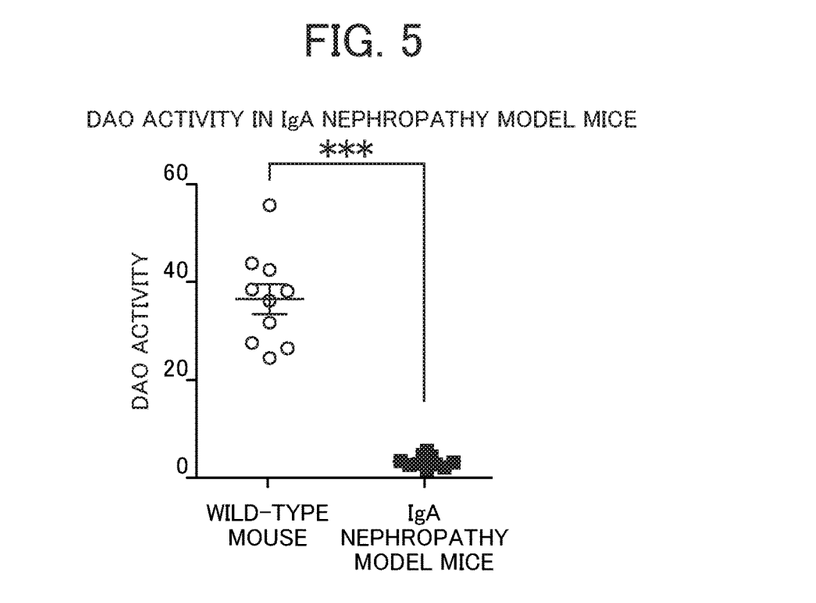
FIG. 5 is a drawing showing comparison of renal DAO activities between wild-type mice and spontaneous IgA nephropathy model mice.

DAO activities were compared between the wild-type mice and spontaneous IgA nephropathy model mice (manufactured by Japan SLC). The DAO activity was determined by the following colorimetric method: Kidney tissue was homogenized in 7 mM citric acid (pH 8.3) and after centrifugation at 5,500×g for 10 minutes, 50 µL of supernatant was mixed with 150 µL of a 100 mM aqueous D-alanine solution, 100 µL of a 0.1 mM aqueous flavin adenine dinucleotide solution, 150 µL of a 700 U/mL catalase-containing 133 mM sodium pyrophosphate solution and 50 µL of methanol, followed by mixing with shaking at 37° C. for 1 h. Reaction was terminated by addition of 500 µL of 10% trichloroacetic acid and centrifuged at 12,000×g for 5 minutes. 250 µL of supernatant was mixed with 250 µL of 5 M sodium hydroxide and 250 µL of 0.5 M hydrochloric acid containing 0.5% of 4-amino-3-hydrazino-5-mercapto-1,2,4-triazole. After standing at ambient temperature for 15 minutes, a 0.2 M aqueous sodium hydroxide solution containing 0.75% of potassium periodate was added to the mixture, followed by invert-mixing and measurement of absorbance at 550 nm. The method of Watanabe et al. (Watanabe T, Motomura Y, Suga T (1978) A new colorimetric determination of D-amino acid oxidase and urate oxidase activity. Anal Biochem 86: 310e315.) was used in the present method. FIG. 5 is a drawing showing comparison of DAO activities between the wild-type mice and the spontaneous IgA nephropathy model mice. In FIG. 5, * indicates significance level $p<0.001$. As is clear from the results shown in FIG. 5**, it can be seen that DAO activities were significantly decreased by more than 90% in the IgA nephropathy model mice.

Figure 6:
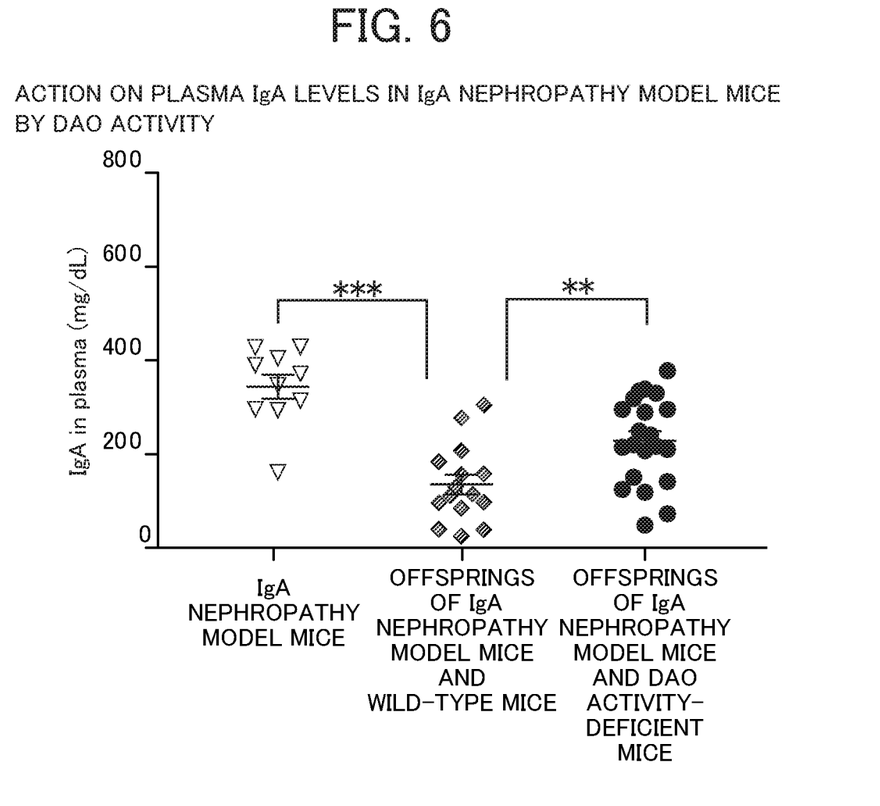
FIG. 6 is a drawing showing the effect of presence or absence of DAO activity on plasma IgA levels in spontaneous IgA nephropathy model mice.

FIG. 6 is a drawing showing plasma IgA levels in a group of offsprings by mating wild-type mice with spontaneous IgA nephropathy model mice and a group of offspring mice by mating DAO activity-deficient mice with spontaneous IgA nephropathy model mice. The results shown in FIG. 6 show that hetero-dilution of genetic factors of the spontaneous IgA nephropathy model mice by mating with the wild-type mice markedly reduced the plasma IgA levels, whereas decreases in the plasma IgA levels were inhibited in mating of the spontaneous IgA nephropathy model mice without DAO activity, with the DAO activity-deficient mice.

This strongly suggests that the DAO activity contributes to the increase in the plasma IgA in the spontaneous IgA nephropathy model mice. Thus, it is suggested that use of promotion of expression of an antibacterial protein (e.g., DAO) gene of the intestinal innate immune system or promotion of expression or activity of the antibacterial protein, as an index, enables one to screen for the prophylactic or therapeutic agent against a disease caused by excessive IgA in the blood.

SEQUENCE LISTING

ATLF-003US_ST25.txt

---

The invention claimed is:

1. A therapeutic method against diseases caused by excessive IgA in the blood, the method comprising:
    administering bacteria of genus *Lactobacillus* to a patient suffering from a disease caused by excessive IgA, after administering an antibiotic,
    wherein the disease caused by excessive IgA is glomerulotubular nephritis caused by excessive IgA in the blood selected from the group consisting of IgA nephropathy, mesangial proliferative nephritis, and purpura nephritis.

2. The method according to claim 1, wherein the glomerulotubular nephritis is mesangial proliferative nephritis or purpura nephritis.

* * * * *

SEQUENCE LISTING

<160> NUMBER OF SEQ ID NOS: 4

<210> SEQ ID NO 1
<211> LENGTH: 347
<212> TYPE: PRT
<213> ORGANISM: Human

<400> SEQUENCE: 1

```
Met Arg Val Val Val Ile Gly Ala Gly Val Ile Gly Leu Ser Thr Ala
1               5                   10                  15

Leu Cys Ile His Glu Arg Tyr His Ser Val Leu Gln Pro Leu Asp Ile
            20                  25                  30

Lys Val Tyr Ala Asp Arg Phe Thr Pro Leu Thr Thr Thr Asp Val Ala
        35                  40                  45

Ala Gly Leu Trp Gln Pro Tyr Leu Ser Asp Pro Asn Asn Pro Gln Glu
    50                  55                  60

Ala Asp Trp Ser Gln Gln Thr Phe Asp Tyr Leu Leu Ser His Val His
65                  70                  75                  80

Ser Pro Asn Ala Glu Asn Leu Gly Leu Phe Leu Ile Ser Gly Tyr Asn
                85                  90                  95

Leu Phe His Glu Ala Ile Pro Asp Pro Ser Trp Lys Asp Thr Val Leu
            100                 105                 110

Gly Phe Arg Lys Leu Thr Pro Arg Glu Leu Asp Met Phe Pro Asp Tyr
        115                 120                 125

Gly Tyr Gly Trp Phe His Thr Ser Leu Ile Leu Glu Gly Lys Asn Tyr
    130                 135                 140

Leu Gln Trp Leu Thr Glu Arg Leu Thr Glu Arg Gly Val Lys Phe Phe
145                 150                 155                 160

Gln Arg Lys Val Glu Ser Phe Glu Glu Val Ala Arg Glu Gly Ala Asp
                165                 170                 175

Val Ile Val Asn Cys Thr Gly Val Trp Ala Gly Ala Leu Gln Arg Asp
            180                 185                 190

Pro Leu Leu Gln Pro Gly Arg Gly Gln Ile Met Lys Val Asp Ala Pro
        195                 200                 205

Trp Met Lys His Phe Ile Leu Thr His Asp Pro Glu Arg Gly Ile Tyr
    210                 215                 220

Asn Ser Pro Tyr Ile Ile Pro Gly Thr Gln Thr Val Thr Leu Gly Gly
225                 230                 235                 240

Ile Phe Gln Leu Gly Asn Trp Ser Glu Leu Asn Asn Ile Gln Asp His
                245                 250                 255

Asn Thr Ile Trp Glu Gly Cys Cys Arg Leu Glu Pro Thr Leu Lys Asn
            260                 265                 270
```

```
Ala Arg Ile Ile Gly Glu Arg Thr Gly Phe Arg Pro Val Arg Pro Gln
            275                 280                 285

Ile Arg Leu Glu Arg Glu Gln Leu Arg Thr Gly Pro Ser Asn Thr Glu
            290                 295                 300

Val Ile His Asn Tyr Gly His Gly Gly Tyr Gly Leu Thr Ile His Trp
305                 310                 315                 320

Gly Cys Ala Leu Glu Ala Ala Lys Leu Phe Gly Arg Ile Leu Glu Glu
            325                 330                 335

Lys Lys Leu Ser Arg Met Pro Pro Ser His Leu
            340                 345

<210> SEQ ID NO 2
<211> LENGTH: 345
<212> TYPE: PRT
<213> ORGANISM: Mouse

<400> SEQUENCE: 2

Met Arg Val Ala Val Ile Gly Ala Gly Val Ile Gly Leu Ser Thr Ala
1               5                   10                  15

Leu Cys Ile His Glu Arg Tyr His Pro Thr Gln Pro Leu His Met Lys
            20                  25                  30

Ile Tyr Ala Asp Arg Phe Thr Pro Phe Thr Thr Ser Asp Val Ala Ala
            35                  40                  45

Gly Leu Trp Gln Pro Tyr Leu Ser Asp Pro Ser Asn Pro Gln Glu Ala
        50                  55                  60

Glu Trp Ser Gln Gln Thr Phe Asp Tyr Leu Leu Ser Cys Leu His Ser
65                  70                  75                  80

Pro Asn Ala Glu Lys Met Gly Leu Ala Leu Ile Ser Gly Tyr Asn Leu
            85                  90                  95

Phe Arg Asp Glu Val Pro Asp Pro Phe Trp Lys Asn Ala Val Leu Gly
            100                 105                 110

Phe Arg Lys Leu Thr Pro Ser Glu Met Asp Leu Phe Pro Asp Tyr Gly
            115                 120                 125

Tyr Gly Trp Phe Asn Thr Ser Leu Leu Leu Glu Gly Lys Ser Tyr Leu
        130                 135                 140

Pro Trp Leu Thr Glu Arg Leu Thr Glu Arg Gly Val Lys Leu Ile His
145                 150                 155                 160

Arg Lys Val Glu Ser Leu Glu Glu Val Ala Arg Gly Val Asp Val Ile
            165                 170                 175

Ile Asn Cys Thr Gly Val Trp Ala Gly Ala Leu Gln Ala Asp Ala Ser
            180                 185                 190

Leu Gln Pro Gly Arg Gly Gln Ile Ile Gln Val Glu Ala Pro Trp Ile
        195                 200                 205

Lys His Phe Ile Leu Thr His Asp Pro Ser Leu Gly Ile Tyr Asn Ser
            210                 215                 220

Pro Tyr Ile Ile Pro Gly Ser Lys Thr Val Thr Leu Gly Gly Ile Phe
225                 230                 235                 240

Gln Leu Gly Asn Trp Ser Gly Leu Asn Ser Val Arg Asp His Asn Thr
            245                 250                 255

Ile Trp Lys Ser Cys Cys Lys Leu Glu Pro Thr Leu Lys Asn Ala Arg
            260                 265                 270

Ile Val Gly Glu Leu Thr Gly Phe Arg Pro Val Arg Pro Gln Val Arg
            275                 280                 285

Leu Glu Arg Glu Trp Leu His Phe Gly Ser Ser Ser Ala Glu Val Ile
            290                 295                 300
```

His Asn Tyr Gly His Gly Gly Tyr Gly Leu Thr Ile His Trp Gly Cys
305                 310                 315                 320

Ala Met Glu Ala Ala Asn Leu Phe Gly Lys Ile Leu Glu Glu Lys Lys
                325                 330                 335

Leu Ser Arg Leu Pro Pro Ser His Leu
            340                 345

<210> SEQ ID NO 3
<211> LENGTH: 1044
<212> TYPE: DNA
<213> ORGANISM: Human

<400> SEQUENCE: 3

| | | | |
|---|---|---|---|
| atgcgtgtgg tggtgattgg agcaggagtc atcgggctgt ccaccgccct ctgcatccat | 60 |
| gagcgctacc actcagtcct gcagccactg acataaagg tctacgcgga ccgcttcacc | 120 |
| ccactcacca ccaccgacgt ggctgccggc ctctggcagc cctacctttc tgaccccaac | 180 |
| aacccacagg aggcggactg agccaacag acctttgact atctcctgag ccatgtccat | 240 |
| tctcccaacg ctgaaaacct gggcctgttc ctaatctcgg gctacaacct cttccatgaa | 300 |
| gccattccgg acccttcctg gaaggacaca gttctgggat tcggaagct gacccccaga | 360 |
| gagctggata tgttcccaga ttacggctat ggctggttcc acacaagcct aattctggag | 420 |
| ggaaagaact atctacagtg gctgactgaa aggttaactg agaggggagt gaagttcttc | 480 |
| cagcggaaag tggagtcttt tgaggaggtg gcaagagaag gcgcagacgt gattgtcaac | 540 |
| tgcactgggg tatgggctgg ggcgctacaa cgagaccccc tgctgcagcc aggccggggg | 600 |
| cagatcatga aggtggacgc ccttggatg aagcacttca ttctcaccca tgacccagag | 660 |
| agaggcatct acaattcccc gtacatcatc ccagggaccc agacagttac tcttggaggc | 720 |
| atcttccagt tgggaaactg gagtgaacta acaatatcc aggaccacaa caccatttgg | 780 |
| gaaggctgct gcagactgga gcccacactg aagaatgcaa gaattattgg tgaacgaact | 840 |
| ggcttccggc cagtacgccc ccagattcgg ctagaaagag aacagcttcg cactggacct | 900 |
| tcaaacacag aggtcatcca aactatggca catggaggct acgggctcac catccactgg | 960 |
| ggatgtgccc tggaggcagc caagctcttt gggagaatcc tggaagaaaa gaaattgtcc | 1020 |
| agaatgccac catcccacct ctga | 1044 |

<210> SEQ ID NO 4
<211> LENGTH: 1038
<212> TYPE: DNA
<213> ORGANISM: Mouse

<400> SEQUENCE: 4

| | | | |
|---|---|---|---|
| atgcgcgtgg ccgtgatcgg agcaggagtc attgggctct ccacagccct ctgcattcat | 60 |
| gagcgttacc acccaacaca gccactgcac atgaagatct atgcagatcg attcaccccg | 120 |
| ttcaccacga gcgatgtggc cgccggcctc tggcagcctt atctctctga ccccagcaac | 180 |
| cctcaggagg cggagtggag ccagcaaacg tttgattacc tgctgagctg cctccattct | 240 |
| ccaaacgctg aaaaaatggg cctggcccta atctcaggct acaacctctt ccgagatgaa | 300 |
| gttccggacc ctttctggaa aaacgcagtt ctgggattcc ggaagctgac ccccagtgag | 360 |
| atggacctgt ccctgattta tggctacggc tggttcaata aagcctcct tctagagggg | 420 |
| aagagctacc tgccatggct aactgagagg ttaactgaga gggagtgaa gcttatccat | 480 |
| cggaaggtgg agtctctcga agaggtggca agaggagtgg atgtgattat caactgcacc | 540 |

-continued

```
ggggtgtggg ccggggccct gcaagcagat gcctccctgc agccaggccg gggccagatc     600
atccaggtgg aggccccttg gattaaacac ttcatcctca cccatgatcc tagccttggt     660
atctacaact ctccgtacat catcccaggt tccaagacag ttacgctcgg gggtatattc     720
cagctgggga actggagcgg gttaaacagc gtccgtgacc acaataccat ttggaagagc     780
tgctgtaaac tggagcccac cctgaagaat gcaagaattg tgggtgaact cactggcttc     840
cggccagtcc ggcctcaggt ccggctagaa agagaatggc ttcattttgg atcttcaagt     900
gcagaggtca tccacaacta tggtcatgga ggttacgggc tcacaatcca ctggggttgt     960
gcaatggagg cggccaacct cttcgggaaa attctagagg aaaagaagtt gtccaggttg    1020
cctccctccc acctctga                                                  1038
```